US008015539B2

(12) United States Patent  
Sonntag et al.

(10) Patent No.: US 8,015,539 B2
(45) Date of Patent: *Sep. 6, 2011

(54) METHOD AND APPARATUS FOR PERFORMANCE METRIC COMPATIBLE CONTROL OF DATA TRANSMISSION SIGNALS

(75) Inventors: Jeffrey Lee Sonntag, Portland, OR (US); Daniel Keith Weinlader, Allentown, PA (US); David Andrew Yokoyama-Martin, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 382 days.

This patent is subject to a terminal disclaimer.

(21) Appl. No.: 12/039,407

(22) Filed: Feb. 28, 2008

(65) Prior Publication Data

US 2008/0144742 A1    Jun. 19, 2008

Related U.S. Application Data

(63) Continuation of application No. 10/979,030, filed on Nov. 1, 2004, now Pat. No. 7,383,518.

(51) Int. Cl.
*G06F 11/22* (2006.01)
*G06F 17/50* (2006.01)
*G06F 11/00* (2006.01)
*G06F 11/30* (2006.01)
*G08C 25/00* (2006.01)
*H03M 13/00* (2006.01)
*H04L 1/00* (2006.01)

(52) U.S. Cl. .................. 716/136; 714/704; 714/746
(58) Field of Classification Search ............. 716/4, 136; 714/704, 746
See application file for complete search history.

(56) References Cited

U.S. PATENT DOCUMENTS

| 5,212,826 | A | 5/1993 | Rabe et al. | |
|---|---|---|---|---|
| 5,268,907 | A | 12/1993 | Suzuki et al. | |
| 5,389,839 | A | 2/1995 | Heck | |
| 5,479,130 | A | 12/1995 | McCartney | |
| 5,579,214 | A | 11/1996 | Kitani et al. | |
| 6,519,302 | B1* | 2/2003 | Bruce et al. | 375/355 |
| 7,026,867 | B2 | 4/2006 | Drost et al. | |
| 7,352,832 | B1* | 4/2008 | Lewis et al. | 375/345 |
| 2002/0138816 | A1* | 9/2002 | Sarrafzadeh et al. | 716/11 |
| 2002/0197975 | A1* | 12/2002 | Chen | 455/324 |
| 2004/0042426 | A1 | 3/2004 | Harris et al. | |
| 2004/0100397 | A1 | 5/2004 | Abdelatty Ali | |
| 2004/0120407 | A1 | 6/2004 | Searles et al. | |
| 2004/0123197 | A1* | 6/2004 | Sunter et al. | 714/724 |
| 2004/0124996 | A1 | 7/2004 | Andersen | |
| 2004/0236547 | A1 | 11/2004 | Rappaport et al. | |
| 2005/0134307 | A1* | 6/2005 | Stojanovic et al. | 326/31 |
| 2005/0212585 | A1 | 9/2005 | Kerth et al. | |

(Continued)

*Primary Examiner* — Suresh Memula
(74) *Attorney, Agent, or Firm* — Park, Vaughan, Fleming & Dowler LLP

(57) ABSTRACT

The DC offset of a differential signal can be changed by differentially shifting the DC offset of each of its signals. Techniques are presented for changing, in a controlled way, the DC offset of a differential signal as received by a receiver of a data transmission system. Several classes of example embodiments, utilizing digitally controllable voltage or current sources, are presented. The classes differ based upon such factors as coupling capacitor arrangement and use of termination resistors. Specific embodiments, within each class, differ based upon such factors as whether voltage or current sources are used and the characteristics of such sources. Once the DC offset of a differential signal has been changed, the effect of such change on a performance metric can be measured. Example applications include the ability to determine a differential signal level that results in BER having a particular level and determination of differential signal margin.

15 Claims, 13 Drawing Sheets

U.S. PATENT DOCUMENTS

| | | | |
|---|---|---|---|
| 2005/0226342 A1* | 10/2005 | Alajaji et al. | 375/264 |
| 2005/0275446 A1 | 12/2005 | Hairston | |
| 2005/0281343 A1* | 12/2005 | Hsu et al. | 375/257 |
| 2006/0067440 A1* | 3/2006 | Hsu et al. | 375/345 |

* cited by examiner

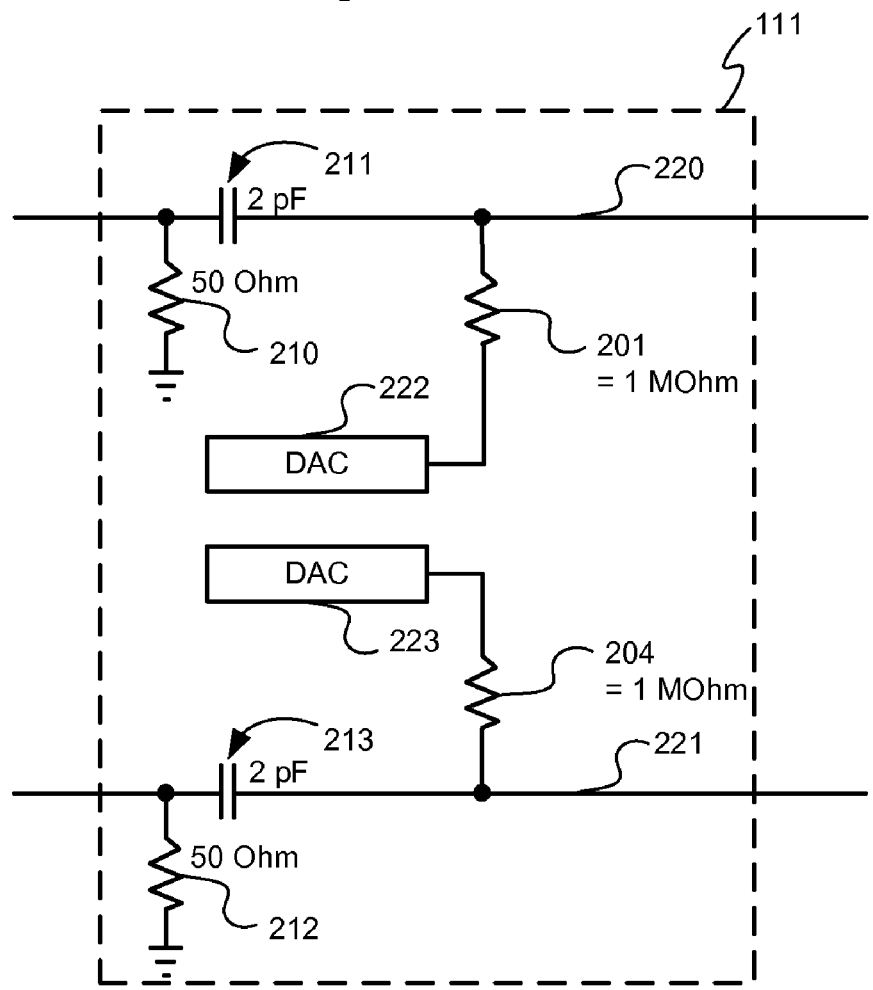

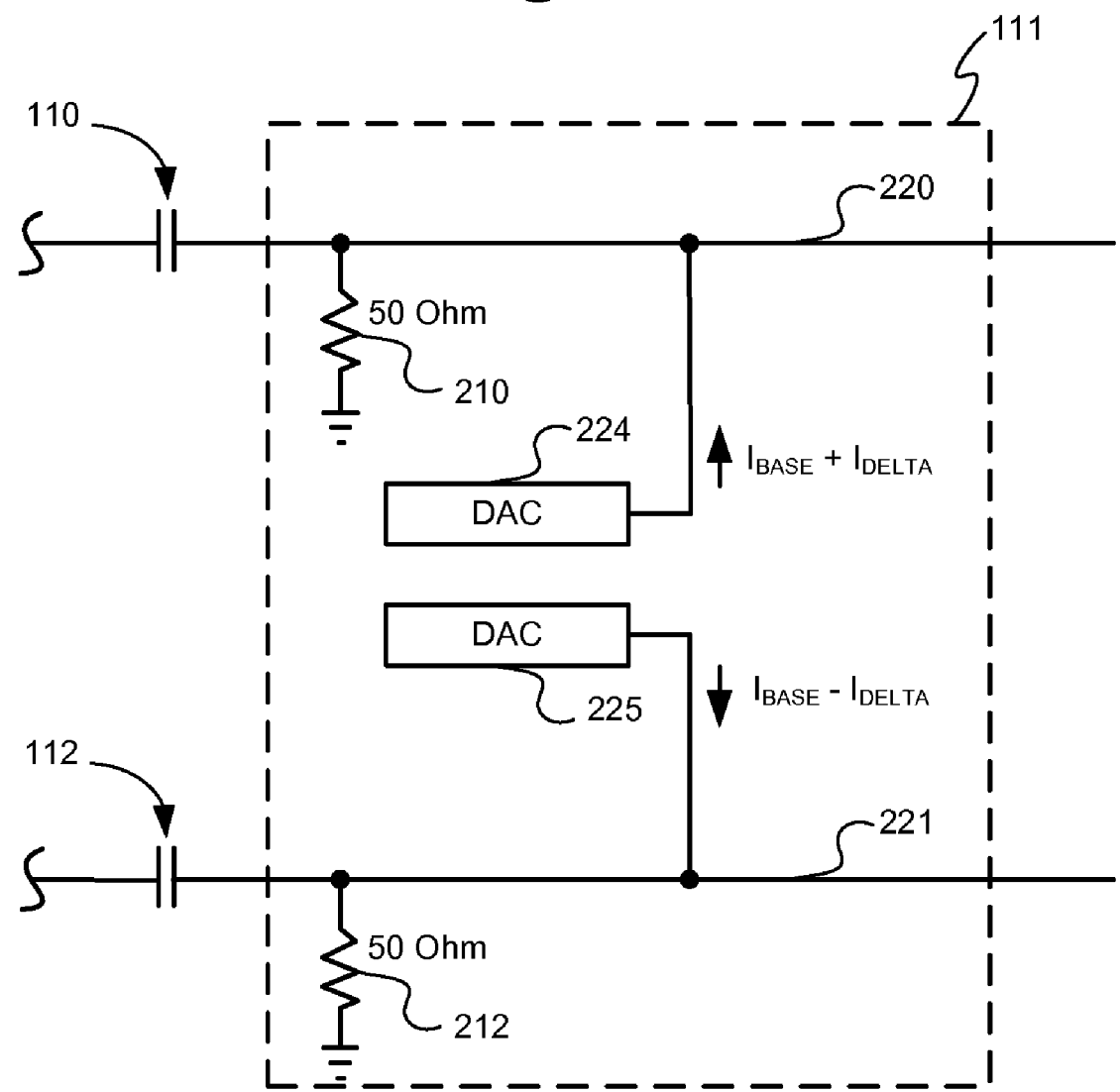

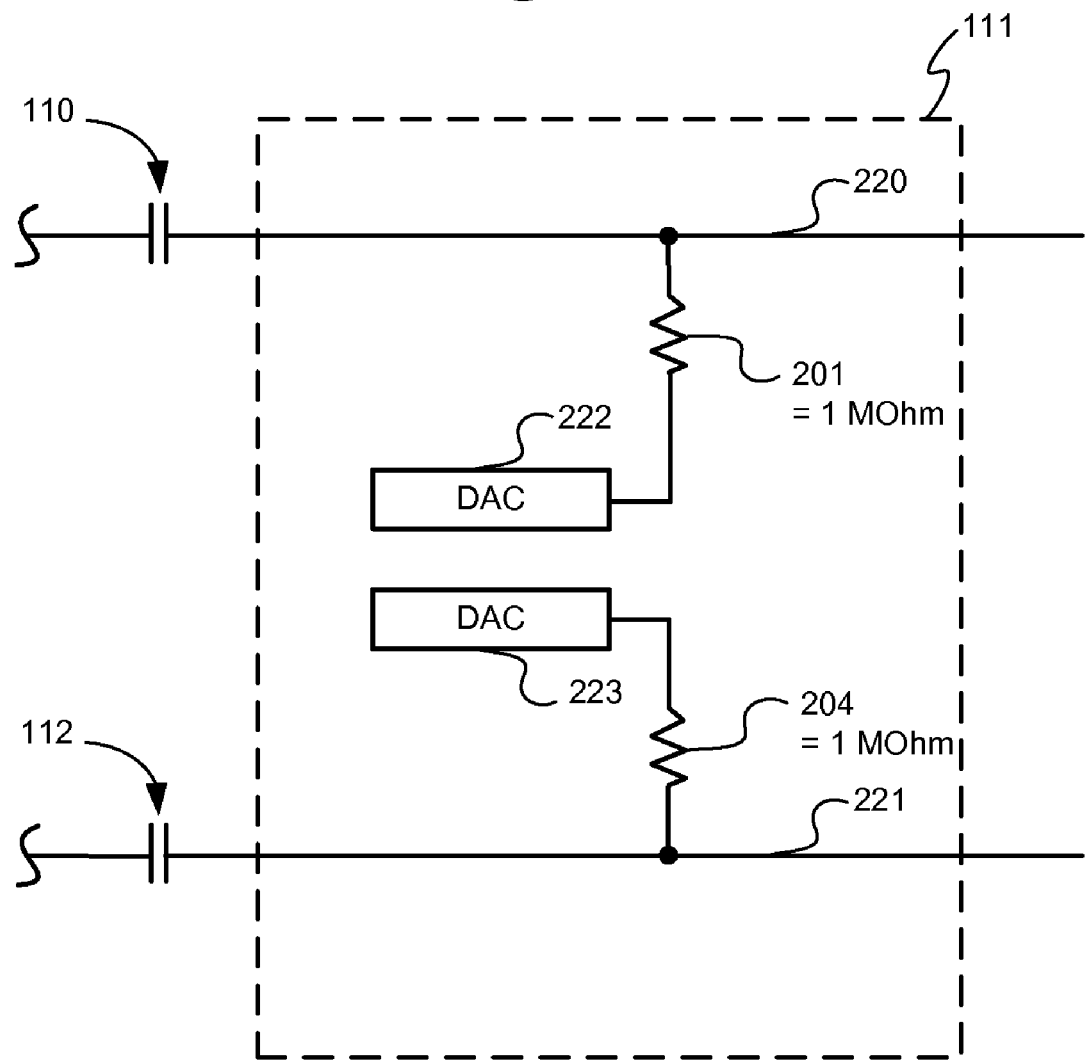

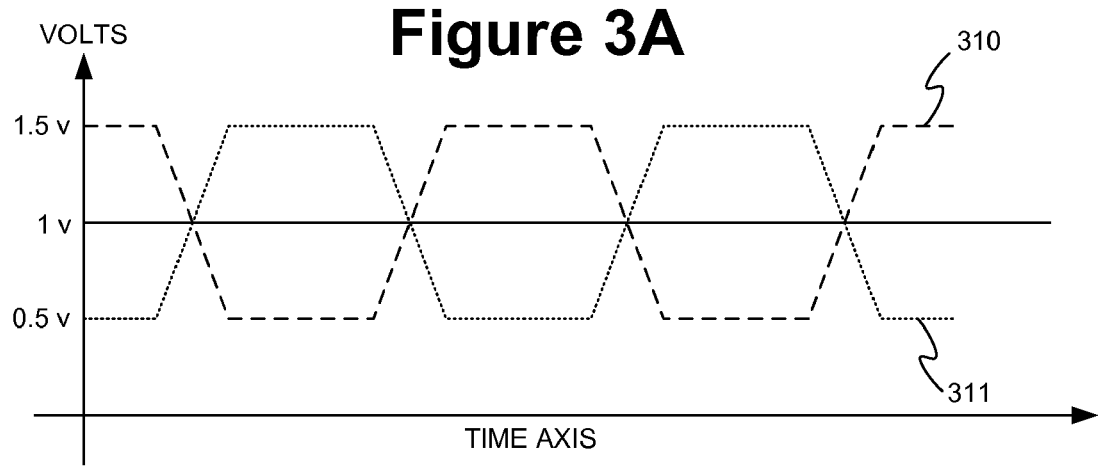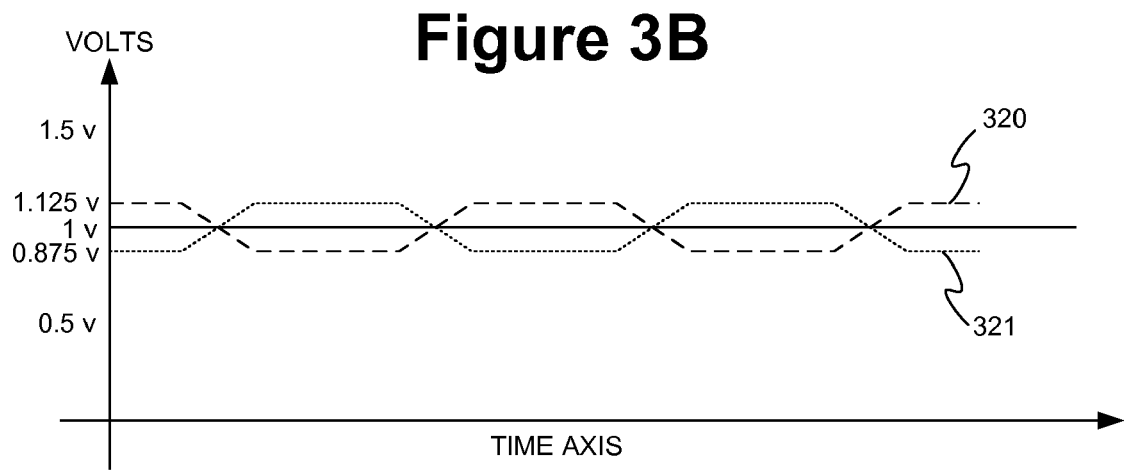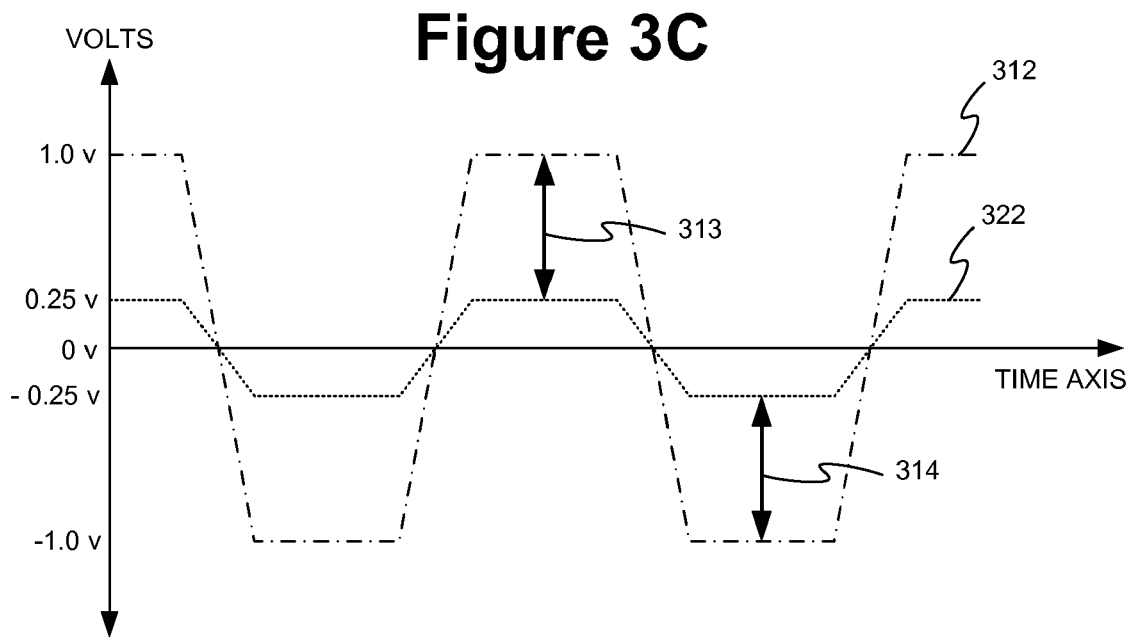

METHOD AND APPARATUS FOR PERFORMANCE METRIC COMPATIBLE CONTROL OF DATA TRANSMISSION SIGNALS

RELATED APPLICATION

This application is a continuation of, and hereby claims priority under 35 U.S.C. §120 to, U.S. patent application Ser. No. 10/979,030, entitled "Method and Apparatus For Performance Metric Compatible Control of Data Transmission Signals," by the same inventors as the instant application, and filed on 1 Nov. 2004.

FIELD OF THE INVENTION

The present invention relates generally to systems that transmit digital information at high-speed, and more particularly to techniques for determining the quality of transmissions by such systems.

BACKGROUND OF THE INVENTION

For data transmission systems (DTSs), a variety of performance metrics, such as symbol error rate (SER), are known to be useful. Such uses include, but are not limited to, the design, use or maintenance of DTSs.

SER can be defined as a ratio of a number of erroneously received symbols over a total number of symbols received. In the case of a binary DTS, SER can be referred to as a bit error rate (BER) that can be defined as a ratio of a number of erroneously received bits over a total number of bits received. An example level of BER, that could be regarded as acceptable for a binary DTS, is $1.0 \times 10^0$ errors per every $1.0 \times 10^{13}$ bits transmitted. This BER ratio can be expressed in shorthand form as $1.0 \times 10^{-13}$.

SER can be measured by having the transmitter of a DTS transmit a pattern of symbols known by the DTS's receiver. The receiver can compare the received symbols to the expected symbols to identify errors. The total number of symbols transmitted can be determined in two ways. First, the receiver can keep a count of the total symbols received in addition to keeping a count of erroneous symbols received. Second, a data rate between the transmitter and receiver can be known. The total number of symbols transmitted can be determined from the time period over which the transmission errors are collected (i.e., time period for collection of errors times data rate).

In addition, the ability to change, in a controlled manner, a characteristic of a DTS, such that a performance metric of the DTS (e.g., the SER of the DTS) can be measured after such change, has useful applications.

For example, a normal SER can be so low that it may not be practical to measure during normal operation of a DTS (e.g., it can take years of normal system operation to accumulate sufficient transmission errors).

An approach to estimating SER under normal operating conditions is to accelerate the errors by operating a DTS at non-normal signal levels. This non-normal SER is greater than the normal SER. The normal SER can be estimated from the following: the non-normal SER, the non-normal signal levels and the normal signal levels. Example procedures for estimating a normal SER from a non-normal SER, are disclosed in the following U.S. patent application that is herein incorporated by reference in its entirety: application Ser. No. 10/323,220, filed Dec. 18, 2002 and entitled "System and Method For characterizing the Performance of Data Communication Systems and Devices."

Thus, there is a need for techniques of changing characteristics of DTSs, where such changes are done in a controlled way that is compatible with the measurement of performance metrics. It can be particularly difficult to achieve such controlled changes in high-speed (e.g., 6.25 Giga-bit/sec) DTSs.

SUMMARY OF THE INVENTION

An example DTS, for differential data transmission (DDT), transmits data from a transmitter to a receiver over a pair of conductors (or "a differential pair"). The data symbols transmitted can be in any suitable format (e.g., binary or PAM4).

The DC offset of a differential signal can be changed by differentially shifting the DC offset of each signal of its differential pair. In general, a shift of differential signal offset occurs whenever the change in DC offset to one signal of a differential pair is different in sign and/or magnitude from the change to DC offset of the other signal.

Following are techniques for changing, in a controlled way, the DC offset of a differential signal as received by a receiver of a DTS. Once the differential signal has been changed, the effect of such change on a performance metric can be measured.

In a first class of example embodiments the receiver is provided with the following. A first set of coupling capacitors (e.g., capacitors 110 and 112) for coupling the receiver to a pair of conductors that couple it to a transmitter. Between the first set of coupling capacitors and the receiver are further coupled a second set of coupling capacitors (e.g., capacitors 211 and 213). Between the first and second set of coupling capacitors, a first set of termination resistors (e.g., resistors 210 and 212) is coupled. The DC offset level, for each of the nodes (e.g., nodes 220 and 221) following the second set of coupling capacitors, can be shifted.

A first example embodiment, within the first class of example embodiments, is as follows: one or both of nodes 220 and 221 is coupled to a digitally controlled voltage source (e.g., a DAC 222 for node 220 and a DAC 223 for node 221). Each of DACs 222 and 223 can be coupled to its respective node through a resistor (e.g., DAC 222 can be coupled to node 220 through a resistor 201 and DAC 223 can be coupled to node 221 through a resistor 204).

An example programming of DACs 222 and 223, to produce a shifting of the DC offset of the differential signal at nodes 220 and 221, is as follows: DACs 222 and 223 can be programmed to produce different voltage levels.

A second example embodiment, within the first class of example embodiments, is as follows. A first circuit is provided that can adjust, by adjusting a single digitally controlled voltage source, two different voltage levels: a first voltage level for node 220 and a second voltage level for node 221. The first voltage level produced can be as much above a common mode voltage as the second voltage level produced is below the common mode voltage.

In a second class of example embodiments, the receiver is provided with the following. A first set of coupling capacitors (e.g., capacitors 110 and 112) for coupling the receiver to a pair of conductors that couple it to a transmitter. Between the first set of coupling capacitors and the receiver is coupled a first set of termination resistors (e.g., resistors 210 and 212). The DC offset level, for each of the nodes (e.g., nodes 220 and 221) following the first set of coupling capacitors, can be shifted.

A first example embodiment, within the second class of example embodiments, is as follows: one or both of nodes 220 and 221 is coupled to a digitally controlled current source (e.g., a DAC 224 for node 220 and a DAC 225 for node 221).

An example programming of DACs 224 and 225, to produce a shifting of the DC offset of the differential signal at nodes 220 and 221, is as follows: DACs 224 and 225 can be programmed to produce different current levels.

A second example embodiment, within the second class of example embodiments, is as follows: one or both of nodes 220 and 221 is coupled to a digitally controlled voltage source through a termination resistor (e.g., a DAC 226 is coupled to a node 220 through a termination resistor 210 and a DAC 227 is coupled to a node 221 through a termination resistor 212). Digitally controlled voltage sources 226 and 227 differ from DACs 222 and 223 in having relatively low output impedance. In general, DACs 226 and 227 can be expected to have impedances lower than that of the termination resistors.

An example programming of DACs 226 and 227, to produce a shifting of the DC offset of the differential signal at nodes 220 and 221, is as follows: DACs 226 and 227 can be programmed to produce different voltage levels.

For a third class of example embodiments, the receiver is provided with the following. A first set of coupling capacitors (e.g., capacitors 110 and 112) for coupling the receiver to a pair of conductors that couple it to a transmitter. The DC offset level, for each of the nodes (e.g., nodes 220 and 221) following the first set of coupling capacitors, can be shifted.

A first example embodiment, within the third class of example embodiments, is as follows: one or both of nodes 220 and 221 is coupled to a digitally controlled voltage source (e.g., a DAC 222 for node 220 and a DAC 223 for node 221). Each of DACs 222 and 223 can be coupled to its respective node through a resistor (e.g., DAC 222 can be coupled to node 220 through a resistor 201 and DAC 223 can be coupled to node 221 through a resistor 204).

An example programming of DACs 222 and 223, to produce a shifting of the DC offset of the differential signal at nodes 220 and 221, is as follows: DACs 222 and 223 can be programmed to produce different voltage levels.

An example application, of being able to change the DC offset of a differential signal of a DTS in a controlled way that is compatible with measurement of an SER, is the ability to determine a differential signal level that results in SER having a particular level.

Given a desired non-normal SER ($SER_{nn}$), a non-normal signal level, of a DTS, can be determined to produce it. The difference between the normal and non-normal signal levels can be referred to as a signal margin. When dealing with differential signals, the signal margin can be referred to as a differential signal margin (DSM). Thus, for a given differential DTS, a DSM is implied with respect to a chosen $SER_{nn}$.

DSM can be defined for a symbol k with respect to each of its adjacent symbols. The DSM of a symbol k with respect to its adjacent symbol k+1 can be represented as $DSM_{k,k+1}$. The DSM of a symbol k with respect to its adjacent symbol k−1 can be represented as $DSM_{k, k-1}$.

Determining $DSM_{k,k+1}$ can involve determining a non-normal signal level for symbol k (such level for k referred to herein as $NNL_{k,k+1}$) that produces, in a DTS, a measured SER ($SER_{mea}$) that approximates, to within an acceptable error bound, $SER_{nn}$.

Determining $DSM_{k,k-1}$ can involve determining a non-normal signal level for symbol k (such level for k referred to herein as $NNL_{k,k-1}$) that produces, in a DTS, a measured SER ($SER_{mea}$) that approximates, to within an acceptable error bound, $SER_{nn}$.

Given a digitally controlled DC offset circuit, for changing the DC offset of a differential signal, procedures for determining $NNL_{k,k+1}$ and $NNL_{k,k-1}$ can be defined.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIGS. 2A to 2E show example circuits, for DC offset circuit 111, that permit changes to the DC offset of a differential signal.

FIG. 3A depicts an example binary-coded differential data transmission as received by a receiver 114.

FIG. 3B represents example minimum signal levels, for receipt of data transmissions, without exceeding a $BER_{max}$.

FIG. 3C depicts the differential signal 312 of the two signals of FIG. 3A and the differential signal 322 of the two signals of FIG. 3B.

FIG. 6A presents a procedure to determine $NNL_{k,k-1}$ while

FIG. 7A presents a procedure to determine $NNL_{k,k-1}$ while

DETAILED DESCRIPTION OF PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

TABLE OF CONTENTS TO DETAILED DESCRIPTION

1. Overview
    1.1. Example Data Transmission System
    1.2. Shifting The DC Offset Of A Differential Signal
    1.3. DC Offset Circuits
    1.4. Determining A Signal Level For A Symbol Error Rate
2. Further Details
    2.1. A DC Offset Circuit Implementation
    2.2. Signal Level For A Symbol Error Rate Determination Procedures
        2.2.1. Initial Value Is $NSL_k$
        2.2.2. Initial Value Is $TSL_{k, k-1}$ Or $TSL_{k, k+1}$ 3. Glossary of Selected Terms
1. Overview
   1.1. Example Data Transmission System As discussed above, a performance metric for measuring the performance of a DTS can be its SER level. More generally, however, a "performance metric" of a DTS can be any metric that quantifies the difference between data received by the DTS ("the received data") and data expected to be received ("the expected data"). Comparison of received data and expected data can be performed in terms of any data unit (e.g., bitwise or bytewise). Furthermore, characteristics of the expected and received data can be determined, and the comparison performed in terms of such characteristics. Example characteristics include code space violations or disparity errors in coded systems. In each case, the presence of a code limits the values of received data, and data that falls outside these limits indicates transmission errors.

Figure 1A:
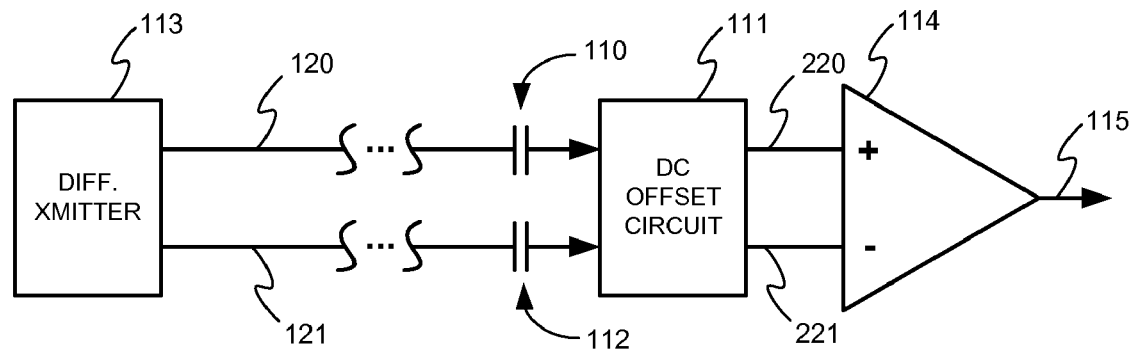
FIG. 1A depicts an example DTS for differential data transmission.

FIG. 1A depicts an example DTS for differential data transmission (DDT) over a pair of conductors (or "a differential pair") 120 and 121. A differential transmitter 113 transmits data to a receiver 114. The data symbols transmitted can be in any suitable format (e.g., binary or PAM 4).

Receiver 114 can have a differential pair as input (e.g., input nodes 220 and 221) and can produce appropriate logic levels at its output (e.g., output node 115). Receiver 114 can be a comparator that outputs a signal level corresponding to a logic one if a signal level (e.g., a voltage) at its positive (or "+") input is greater than a signal level at its negative (or "−") input. Conversely, receiver 114 can output a signal level corresponding to a logic zero if a signal level at its negative input is greater than a signal level at its positive input.

Coupling capacitors (e.g., capacitors 110 and 112) can be placed between the transmitter and receiver. For example, under the "PCI EXPRESS" standard, coupling capacitors are used. PCI EXPRESS is administered by the PCI Special Interest Group, Portland, Oreg., U.S.A.

Figure 1B:
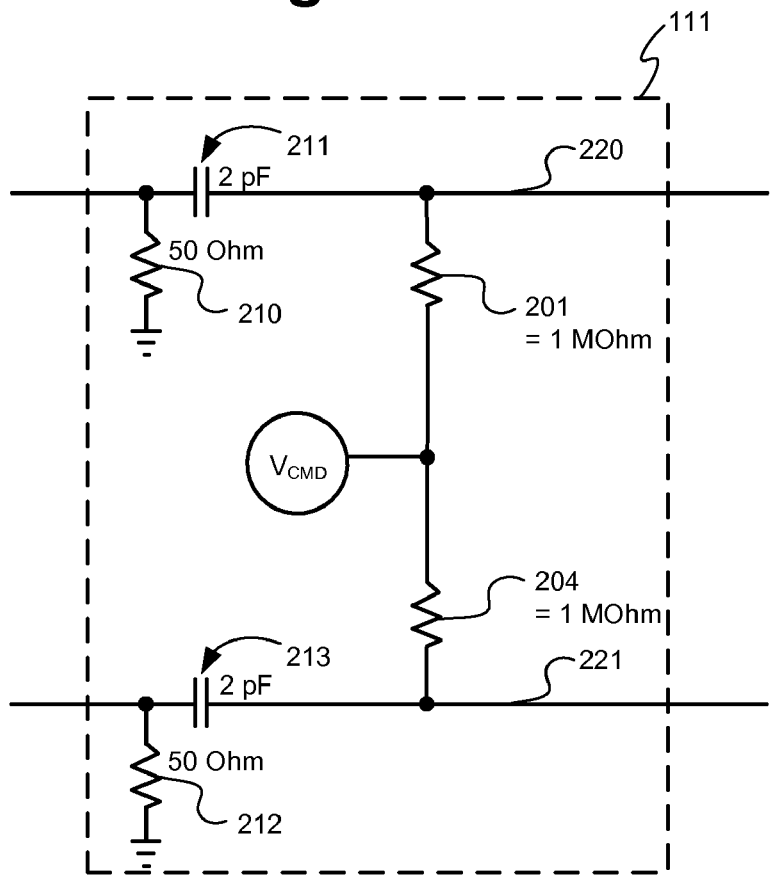
FIG. 1B depicts an example embodiment for the DC offset circuit 111 of FIG. 1A that does not change the DC offset of a differential signal.

FIG. 1A includes a DC offset circuit 111, an example embodiment for which is shown in FIG. 1B. DC offset circuit 111 includes AC coupling capacitors 211 and 213. In some DDT links, it is desirable to have such AC coupling capacitors after the termination resistors (210 and 212 in FIG. 1B). For instance, in the "PCI EXPRESS" standard, without AC coupling capacitors, the termination resistors would set the common-mode of the received signal to ground which is undesirable for many receiver implementations. The common-mode level at the nodes following the AC coupling capacitors (e.g., receiver input nodes 220 and 221 of FIG. 1B), however, can be shifted. FIG. 1B depicts an example prior art DC offset circuit in which a voltage source (referred to herein as $V_{CMD}$) sets a common mode voltage through resistors 201 and 204.

1.2. Shifting the Dc Offset of a Differential Signal

This section discusses techniques for changing, in a controlled way, the DC offset of a differential signal of a DTS. Once the differential signal has been changed, the effect of such change on a performance metric can be measured.

FIG. 3A depicts an example binary-coded DDT as received by a receiver 114. A signal 310 is the positive input of receiver 114 while a signal 311 is the negative input of receiver 114. Signals 310 and 311 have the same amplitude and frequency, but are 180 degrees out of phase. Signals 310 and 311 have been set, by DC offset circuit 111, to have the same average amplitude (or DC offset). For the example of FIG. 3A, each signal has a 1.0 volt DC offset, with peak values of 0.5 volts and 1.5 volts. FIG. 3C depicts the difference (or differential signal) 312 of the two signals of FIG. 3A.

Receiver 114 outputs a logic one when the differential signal is greater than zero and a logic zero when the differential signal is negative. A positive differential signal indicates the positive input to receiver 114 has a greater signal level than the negative input to receiver 114, which is a sufficient condition to cause receiver 114 to produce a logic one. Conversely, a negative differential signal indicates the negative input to receiver 114 has a greater signal level than the positive input to receiver 114, which is a sufficient condition for receiver 114 to produce a logic zero.

Figure 4A:
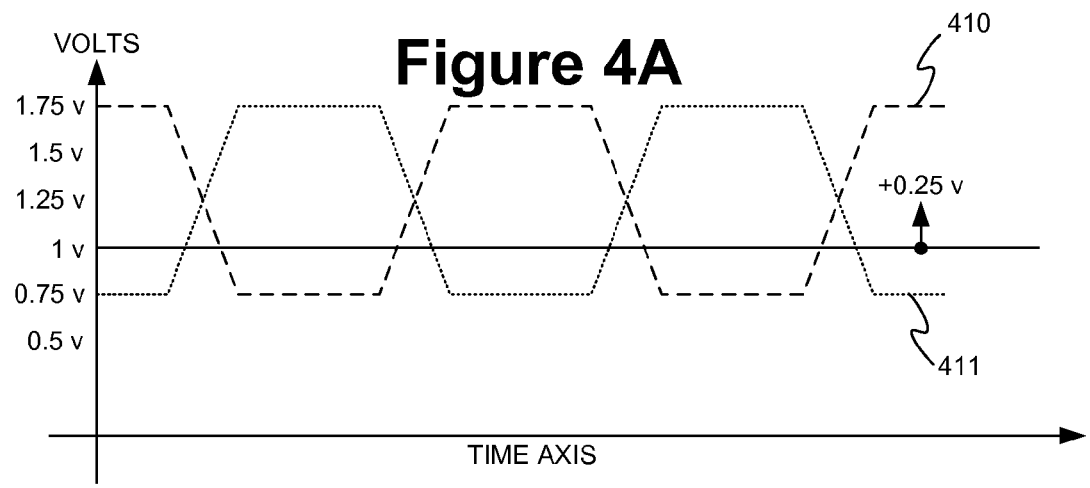
FIG. 4A depicts signals with a greater DC offset than the corresponding signals of FIG. 3A.
Figure 4B:
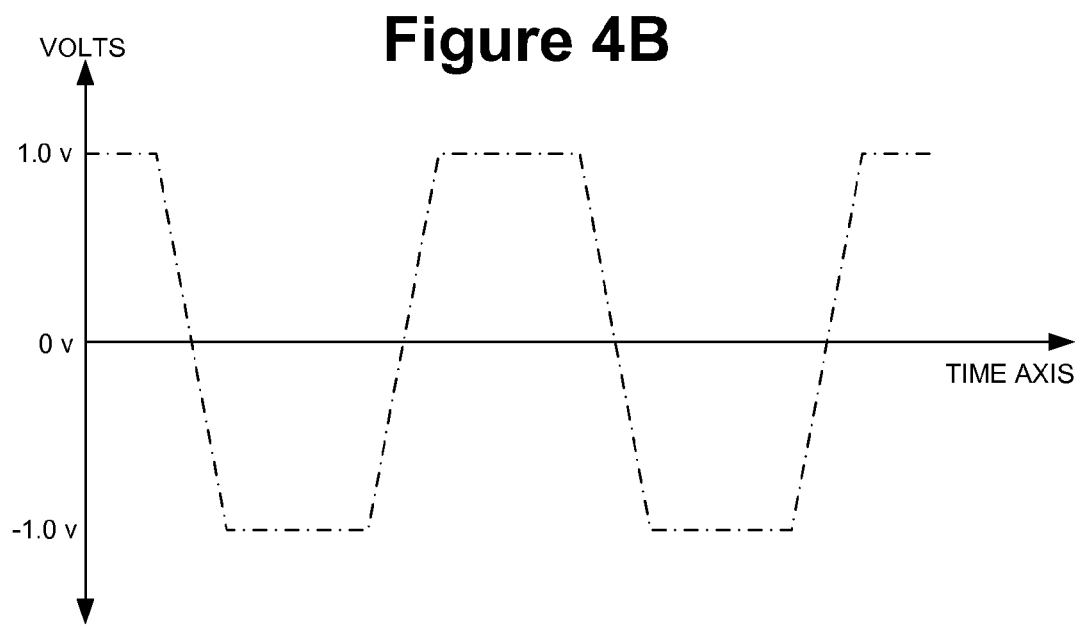
FIG. 4B depicts the difference (or differential signal) of the two signals of FIG. 4A.

A well-known advantage of DDT is its rejection of common-mode noise, a property illustrated by FIGS. 4A and 4B. FIG. 4A depicts signals 410 and 411 that are the same as, respectively, signals 310 and 311, except the DC offset of signals 410 and 411 are greater (e.g., greater by 0.25 volts). FIG. 4B depicts the difference of the two signals of FIG. 4A. As can be seen, the differential signal of FIG. 4B is the same as differential signal 312 of FIG. 3C.

The DC offset of a differential signal can be changed, however, by differentially shifting the DC offset of each signal of its differential pair. In general, a shift of differential signal offset occurs whenever the change in DC offset to one signal of a differential pair is different in sign and/or magnitude from the change to DC offset of the other signal.

Figure 5A:
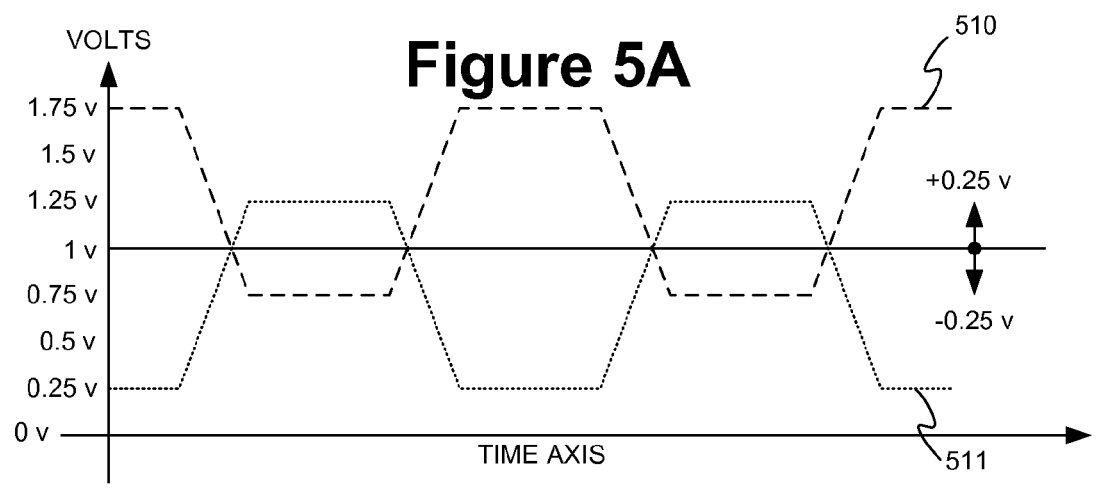
FIG. 5A depicts signals where, with respect to FIG. 3A, one signal has had its DC offset increased and the other has had its DC offset decreased.

In FIG. 5A, for example, signal 510 is the same as signal 310, except the DC offset has been increased (e.g., increased by 0.25 volts) and signal 511 is the same as signal 311, except the DC offset has been decreased (e.g., decreased by 0.25 volts).

Figure 5B:
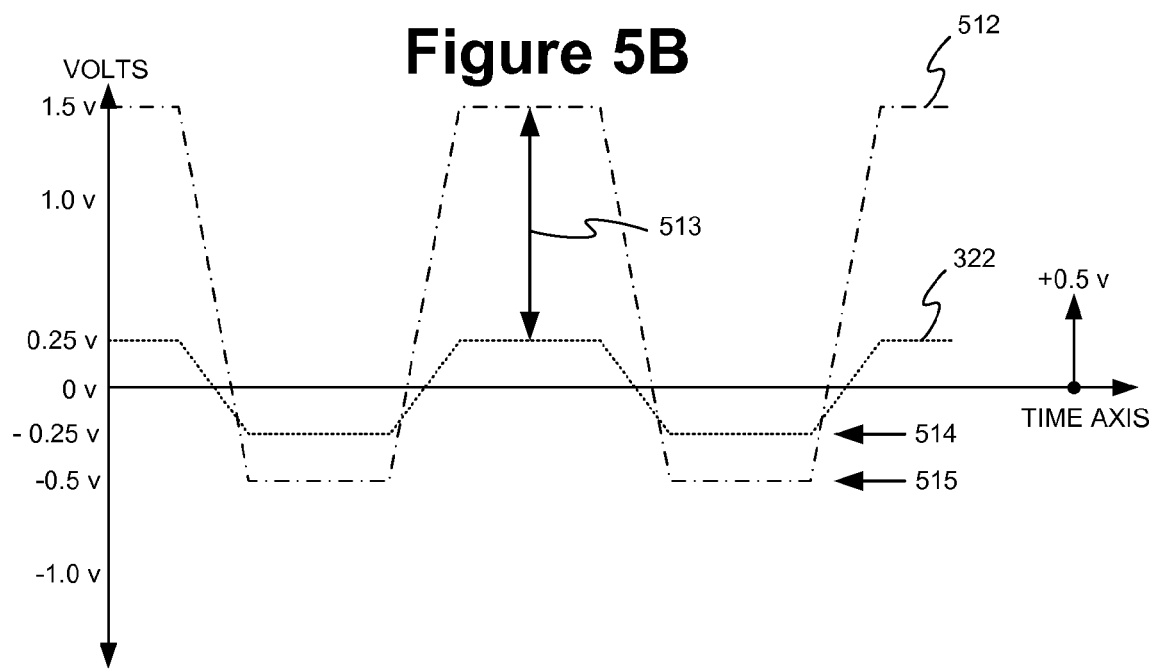
FIG. 5B depicts the difference (or differential signal) 512 of the two signals of FIG. 5A and the differential signal 322 of the two signals of FIG. 3B.

FIG. 5B depicts the differential signal 512 for the differential signal pair of FIG. 5A. As can be seen, signal 512 differs from signal 312 of FIG. 3C: the average level of 512 is greater (i.e., the DC offset of 512 is greater than that of 312 by 0.5 volts).

1.3. DC Offset Circuits

Any circuit, for DC offset circuit 111, that permits controllable differential changes to DC offset voltage, can be utilized. Example embodiments, for DC offset circuit 111, are shown in FIGS. 2A-2E.

The circuit of FIG. 2A is directed to the same general situation shown in FIG. 1B: a receiver with termination resistors (e.g., 210 and 212), coupling capacitors (e.g., 110 and 112) before the termination resistors and coupling capacitors (e.g., 211 and 213) after the termination resistors. However, rather driving resistors 201 and 204 from the same voltage source, as is shown in FIG. 1B, in FIG. 2A resistor 201 is driven by a DAC 222 and resistor 204 is driven by a DAC 223.

To produce a DC offset of zero for a differential signal (a typical offset during normal data transmission) DACs 222 and 223 can be programmed to generate the same voltage level. For example, to produce signals 310 and 311 of FIG. 3A, DACs 222 and 223 can each be programmed to output +1.0 volt. To produce signals 410 and 411 of FIG. 4A, DACs 222 and 223 can each be programmed to output +1.25 volts.

To produce non-zero DC offsets for a differential signal, the DACs can be programmed to produce different voltage levels. To produce signals 510 and 511 of FIG. 5A, DAC 222 can be programmed to output +1.25 volts while DAC 223 can be programmed to output +0.75 volts.

The particular values for resistors 201 and 204 can vary widely, influenced by such factors as the level of capacitive coupling (determined by the first set of coupling capacitors 110 and 112, as well as by the second set of capacitors 211 and 213) and the need for noise immunity. An example range of values for each of resistors 201 and 204 is 0.5 MOhm to 10.0 MOhm.

Another example circuit for DC offset circuit 111, that achieves similar functionality to FIG. 2A, is shown in FIG.

Figure 2B:
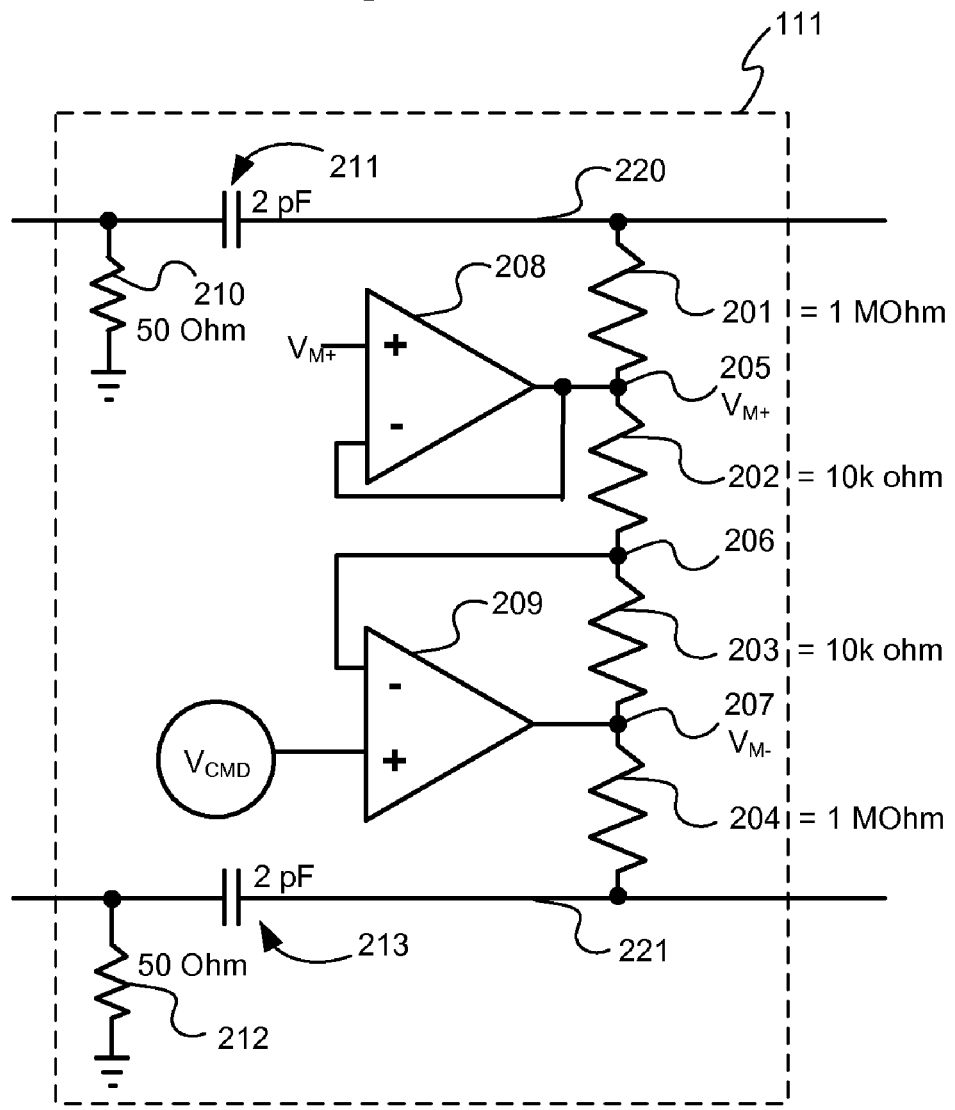

2B. The specific operation of FIG. 2B is discussed in the below section 2.1: "A DC Offset Circuit Implementation."

Figure 2D:
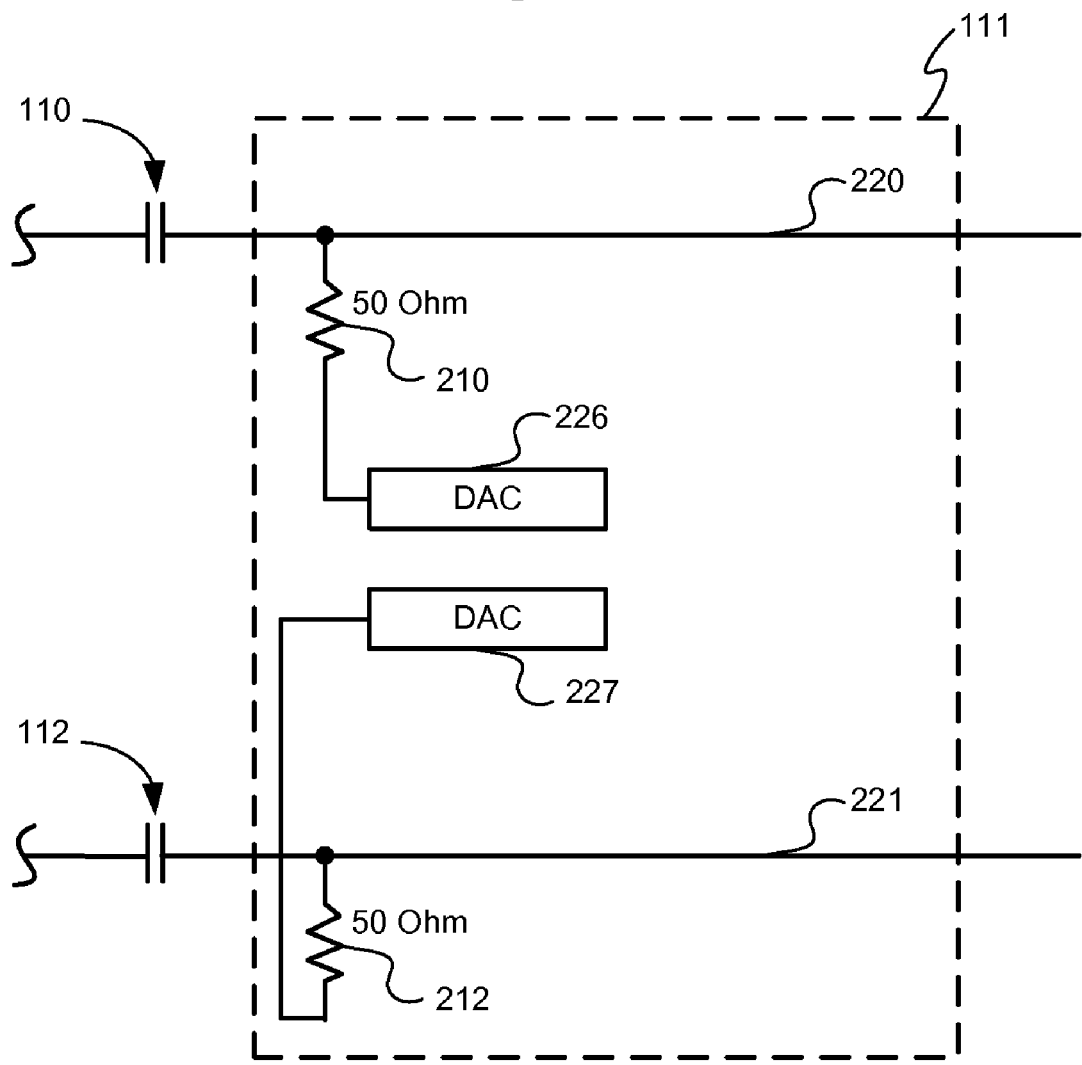

FIGS. 2C and 2D are directed to the following situation: a receiver with termination resistors (e.g., 210 and 212), coupling capacitors (e.g., 110 and 112) before the termination resistors and no coupling capacitors after the termination resistors.

In the absence of a second set of capacitors after the termination resistors, a digitally controlled voltage offset can still be forced onto the single set of coupling capacitors. An example of this approach is shown in FIG. 2C, where the lack of post-termination resistor capacitors is addressed with digitally controlled current sources 224 and 225 (also known as "current DACs"). Other than achieving its effect through controlled current sources, rather than a controlled voltage sources, the circuit of FIG. 2C can be digitally programmed in a similar manner to the circuit of FIG. 2A.

To produce a DC offset of zero for a differential signal DACs 224 and 225 can be programmed to generate the same current level. For example, to produce signals 310 and 311 of FIG. 3A, DACs 224 and 225 can each be programmed to output the current level shown in FIG. 2C as $I_{BASE}$.

To produce non-zero DC offsets for a differential signal, the DACs can be programmed to produce different current levels. To produce signals 510 and 511 of FIG. 5A, DAC 224 can be programmed to output $I_{BASE}+I_{DELTA}$ while DAC 225 can be programmed to output $I_{BASE}-I_{DELTA}$.

In FIG. 2D, the voltage offset is imposed on a single set of coupling capacitors with digitally controlled voltage sources 226 and 227, that differ from DACs 222 and 223 in having relatively low output impedance. In general, DACs 226 and 227 can be expected to have impedances lower than that of the termination resistors (e.g., 210 and 212).

FIG. 2E is directed to the following situation: a receiver with no termination resistors and one set of coupling capacitors (e.g., 110 and 112). The circuitry of FIGS. 2A and 2B, as connected after the post-termination resistor capacitors (e.g., 211 and 213), can be applied after the one set of coupling capacitors of FIG. 2E. FIG. 2E depicts the circuitry of FIG. 2A applied in this way.

1.4. Determining a Signal Level for a Symbol Error Rate

An example application, of being able to change the DC offset of a differential signal of a DTS in a controlled way that is compatible with measurement of an SER, is the ability to determine a differential signal DC offset that results in SER having a particular level.

Given a desired non-normal SER ($SER_{nn}$), a non-normal signal level, of a DTS, can be determined to produce it. The difference between the normal and non-normal signal levels can be referred to as a signal margin. When dealing with differential signals, the signal margin can be referred to as a differential signal margin (DSM).

Thus, for a given differential DTS, a DSM is implied with respect to a chosen $SER_{nn}$. Furthermore, for a DDT that encodes n data bits into a symbol, signal margin can be defined as follows.

Each symbol can be referred to by an integer k, where k varies from k=0 to k=n-1. Each symbol k can be encoded at a normal differential signal level, referred to as $NSL_k$, where the normal differential signal level increases with k.

For a symbol k, symbols k-1 and k+1 are adjacent to k if there is no other symbol whose normal signal level is between either k and k-1 or k and k+1.

The signal level half-way between two normal signal levels can be referred to as a threshold signal level. For a symbol k, the threshold signal level between $NSL_k$ and $NSL_{k+1}$ can be referred to as $TSL_{k,k+1}$ and the threshold signal level between $NSL_k$ and $NSL_{k-1}$ can be referred to as $TSL_{k,k-1}$.

DSM can be defined for a symbol k with respect to each of its adjacent symbols. The DSM of a symbol k with respect to its adjacent symbol k+1 can be represented as $DSM_{k,k+1}$. The DSM of a symbol k with respect to its adjacent symbol k-1 can be represented as $DSM_{k,k-1}$.

Determining $DSM_{k,k+1}$ can involve two steps. First, determining a non-normal signal level for symbol k (such level for k referred to herein as $NNL_{k,k+1}$) that produces, in a DTS, a measured SER ($SER_{mea}$) that approximates, to within an acceptable error bound, $SER_{nn}$. $NNL_{k,k+1}$ will be between $NSL_k$ and $TSL_{k,k+1}$. Second, a signal margin is found by determining the following difference: $DSM_{k,k+1}=NSL_k-NNL_{k,k+1}$.

Determining $DSM_{k,k-1}$ can involve two steps. First, determining a non-normal signal level for symbol k (such level for k referred to herein as $NNL_{k,k-1}$) that produces, in a DTS, a measured SER ($SER_{mea}$) that approximates, to within an acceptable error bound, $SER_{nn}$. $NNL_{k,k-1}$ will be between $NSL_k$ and $TSL_{k,k-1}$. Second, a signal margin is found by determining the following difference: $DSM_{k,k-1}=NSL_k-NNL_{k,k-1}$.

For a binary encoded DDT, the above definition for DSM simplifies to the following.

There are two symbols: k=0 and k=1. The normal differential signal levels are $NSL_0$ and $NSL_1$. The threshold signal levels are $TSL_{0,1}$ and $TSL_{1,0}$, where $TSL_{0,1}=TSL_{1,0}=0$.

$$DSM_{0,1}=NSL_0-NNL_{0,1} \text{ and } DSM_{1,0}=NSL_1-NNL_{1,0}.$$

An example DSM, for a binary encoded DDT, follows.

FIG. 3A represents example normal signal levels for receipt of data transmissions, with the corresponding differential signal shown as signal 312 in FIG. 3C. FIG. 3B represents example data transmission signal levels that produce, in a DTS, a $BER_{mea}$ that approximates, to within an acceptable error bound, a $BER_{nn}$. The corresponding differential signal, for the differential pair of FIG. 3B (represented by singular signals 320 and 321), is shown as signal 322 in FIG. 3C. These signal levels are shown as voltages.

$NSL_1$ for 312 is 1.0 volts, while $NSL_0$ is −1.0 volts. $NNL_{1,0}$ for 322 is 0.25 volts, while $NNL_{0,1}$ is −0.25 volts. $DSM_{0,1}=-1.0--0.25=-0.75$ volts (indicated in FIG. 3C by arrow 314) and $DSM_{1,0}=1.0-0.25=0.75$ volts (indicated in FIG. 3C by arrow 313).

Another example DSM is determined for FIG. 5, where the DC offset of the differential signal has been shifted relative to FIG. 3.

As a result of a shift in offset of the differential signal of FIG. 5B, with respect to FIG. 3C, $NSL_1$ for 512 is 1.5 volts, while $NSL_0$ is −0.5 volts. Since receiver 114, however, still detects whether to output a logic one or zero on the basis of whether the differential signal is above or below zero, $NNL_{1,0}$ is still 0.25 volts (shown by signal 322 in FIG. 5B), while $NNL_{0,1}$ is still −0.25 volts.

Thus, the DSMs for FIG. 5B are as follows.

$DSM_{0,1}=-0.5--0.25=-0.25$ volts (the difference between arrows 515 and 514 in FIG. 5B) and $DSM_{1,0}=1.5-0.25=1.25$ volts (indicated in FIG. 5B by arrow 513).

Given a digitally controlled DC offset circuit 111, for changing the DC offset of a differential signal, procedures for determining $NNL_{k,k+1}$ and $NNL_{k,k-1}$ can be defined. Procedures for determining $NNL_{k,k+1}$ and $NNL_{k,k-1}$ are presented in the below section 2.2: "Signal Level For A Symbol Error Rate Determination Procedures."

2. Further Details

2.1. A DC Offset Circuit Implementation

An explanation of the circuit of FIG. 2B follows.

Opamps 208 and 209 change their output signal level in order to keep their inputs at the same signal level.

Since the positive input to opamp 209 is fixed at $V_{CMD}$, opamp 209 will adjust the voltage at its output node 207 to keep node 206 at the same level as $V_{CMD}$.

Since the negative input of opamp 208 is fixed at $V_{M+}$, opamp 208 will adjust the voltage at its output node 205 to keep output node 205 equal to $V_{M+}$.

Thus far, it has been shown there is a voltage drop between nodes 205 and 206 due to the difference between $V_{M+}$ and $V_{CMD}$.

Example values for $V_{M+}$ and $V_{CMD}$ are as follows. To achieve the differential offsets of FIG. 5A, $V_{M+}$ can be set to +1.25 volts and $V_{CMD}$ can be set to +1.0 volts. The voltage drop between nodes 205 and 206 is 0.25 volts.

The same voltage drop between nodes 205 and 206 must also occur between nodes 206 and 207, since resistor 203 has the same resistance as resistor 202. Therefore, exactly as much as $V_{M+}$ is above $V_{CMD}$, $V_{M-}$ is below $V_{CMD}$.

Continuing with the example of FIG. 5A, $V_{M-}$ is +0.75 volts.

$V_{M+}$ can be generated by a DAC in order to provide a digitally controllable differential offset. $V_{M+}$ can be a sum of the output voltage of the DAC and a bias voltage determined by $V_{CMD}$.

2.2. Signal Level for a Symbol Error Rate Determination Procedures

This section presents two types of procedures for measuring $NNL_{k,k+1}$ and $NNL_{k,k-1}$, for a symbol k of a DDT encoded with n signal levels.

Figure 6A:
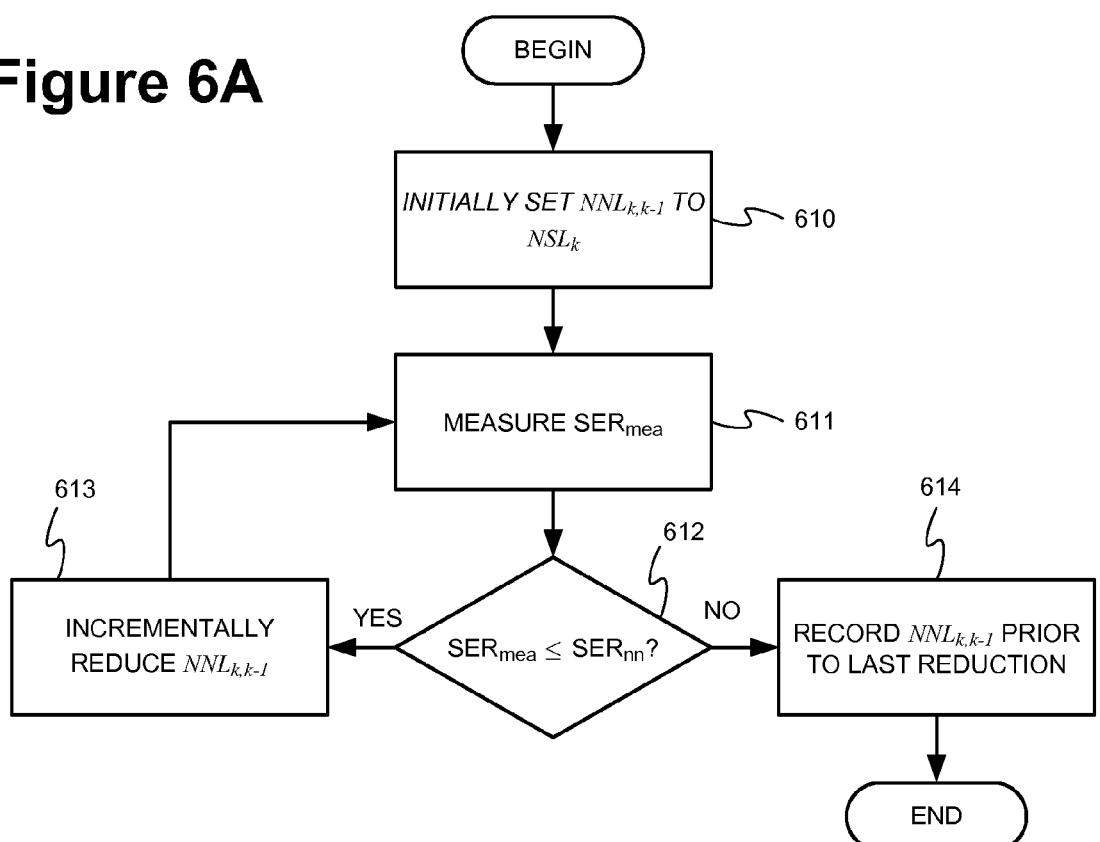
Figure 6B:
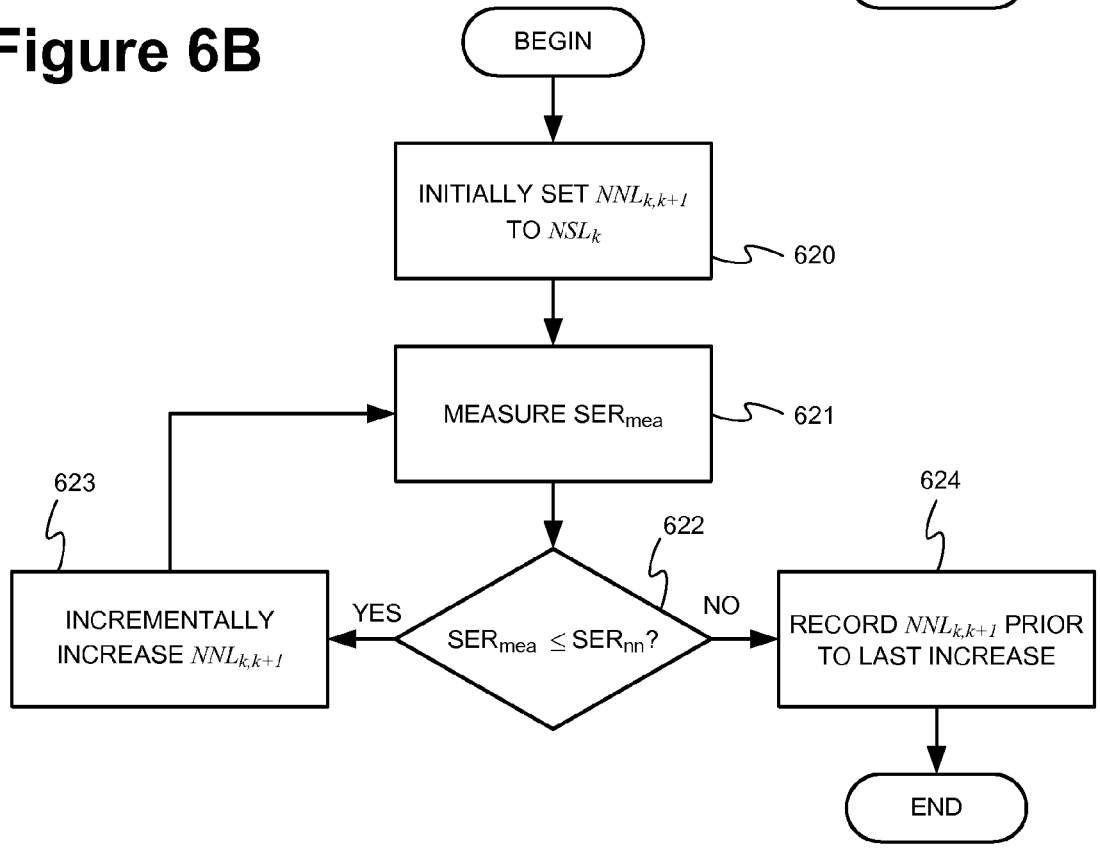
FIG. 6B presents a procedure to determine $NNL_{k,k+1}$.

The first type, depicted in FIGS. 6A and 6B, begins with, respectively, $NNL_{k,k-1}$ and $NNL_{k,k+1}$ set to $NSL_k$.

Figure 7A:
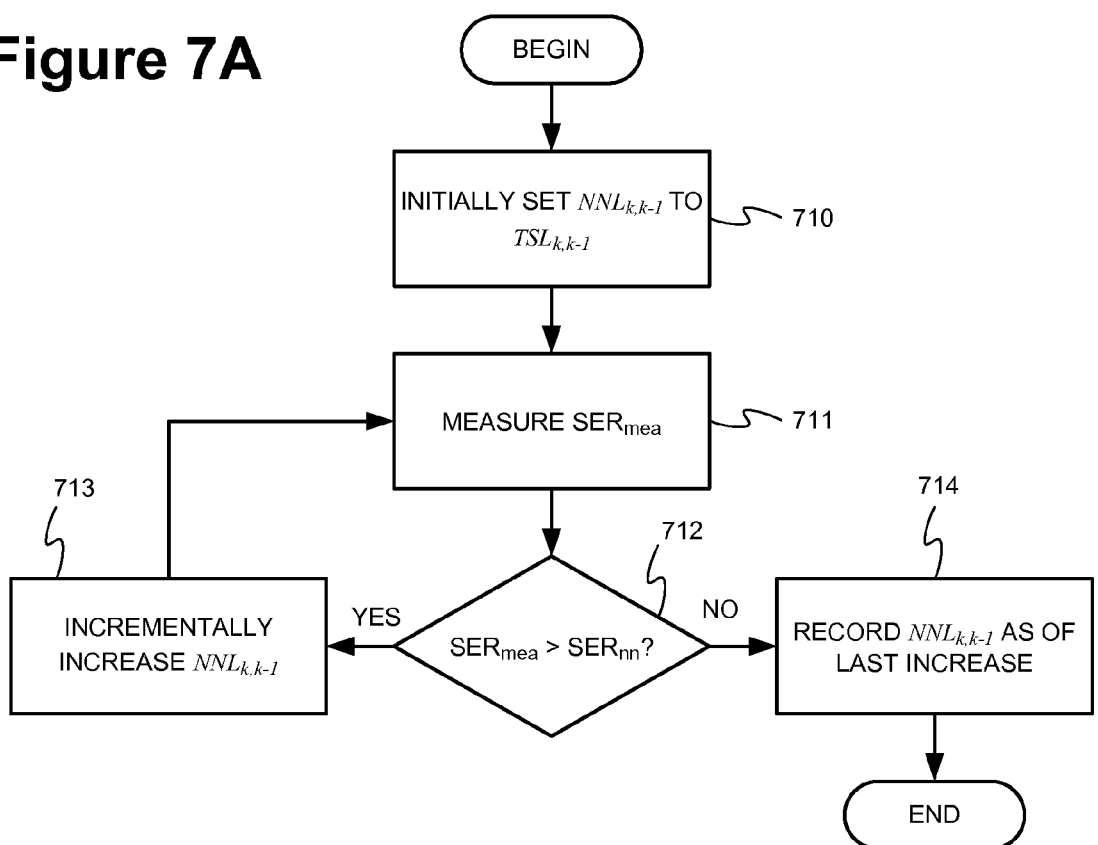
Figure 7B:
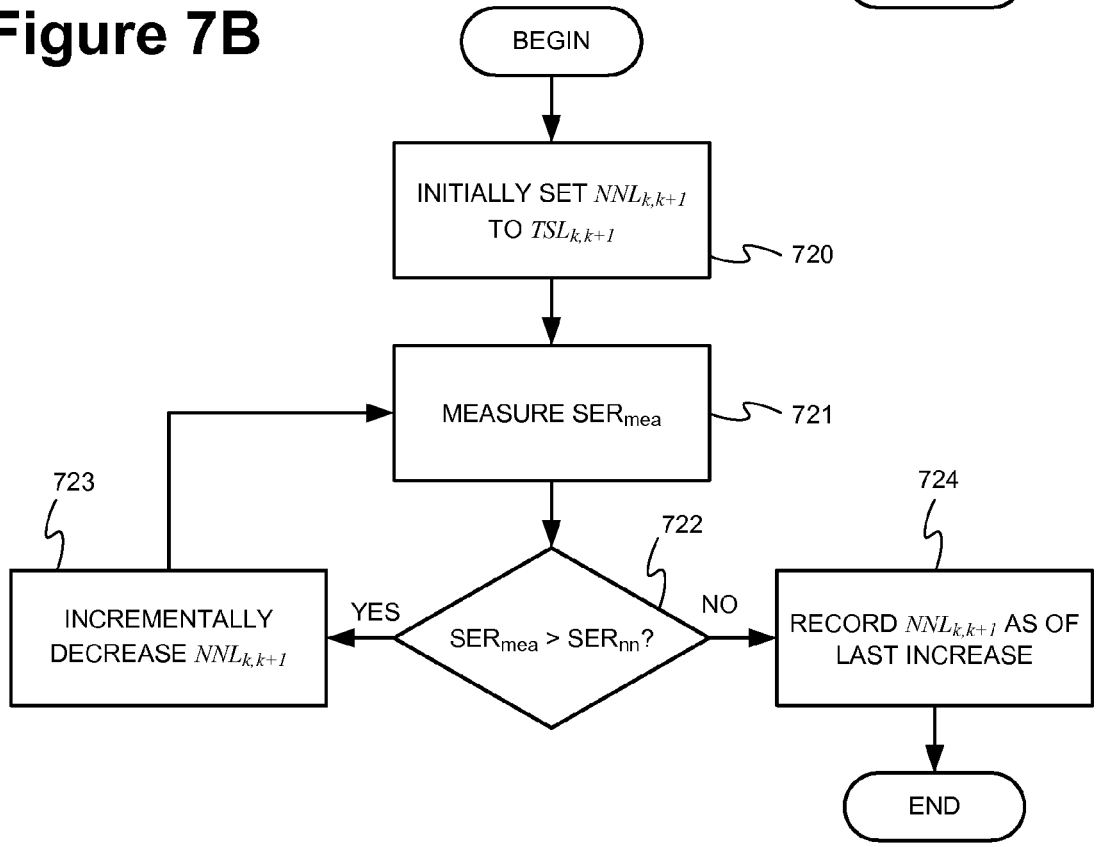
FIG. 7B presents a procedure to determine $NNL_{k,k+1}$.

The second type, depicted in FIGS. 7A and 7B, begins with, respectively, $NNL_{k,k-1}$ set to $TSL_{k,k-1}$ and $NNL_{k,k+1}$ set to $TSL_{k,k+1}$.

In the procedures for determination of $NNL_{k,k-1}$ and $NNL_{k,k+1}$ given below, $SER_{mea}$ can be determined with respect to symbol k ($SER_{mea,k}$). $SER_{mea,k}$ can be the ratio of the number of times symbol k is erroneously received over the total number of times symbol k is received.

As discussed above, once $NNL_{k,k-1}$ and $NNL_{k,k+1}$ and have been found, $DSM_{k,k-1}=NSL_k-NNL_{k,k-1}$ and $DSM_{k,k+1}=NSL_k-NNL_{k,k+1}$.

Figure 8:
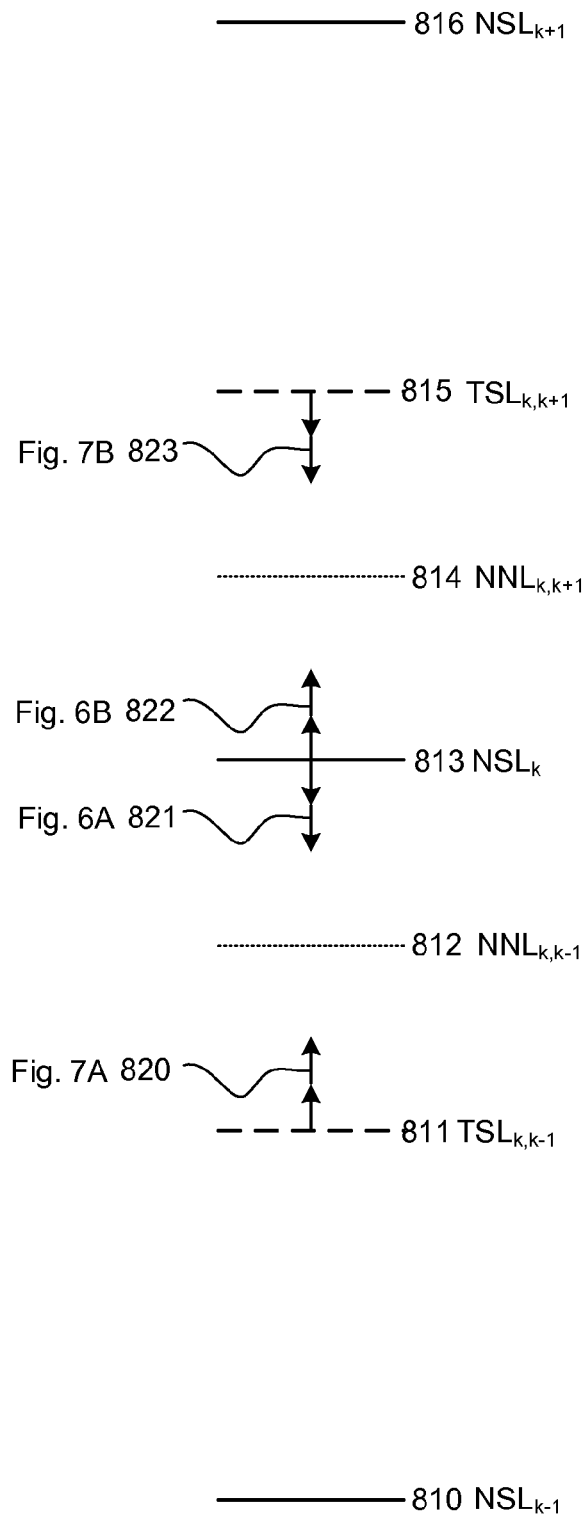
FIG. 8 further illustrates the procedures of FIGS. 6A, 6B, 7A and 7B.

The procedures of FIGS. 6A, 6B, 7A and 7B are further illustrated by FIG. 8. FIG. 8 shows an $NSL_k$ (level 813), with its adjacent normal signal levels being an upper $NSL_{k+1}$ (level 816) and a lower $NSL_{k-1}$ (level 810). Halfway between levels 813 and 816 is $TSL_{k,k+1}$ (level 815) and halfway between levels 813 and 810 is $TSL_{k,k-1}$ (level 811). $NNL_{k,k+1}$ (level 814) is shown as being somewhere between levels 813 and 815, but the particular value of level 814 needs to be determined. Similarly, $NNL_{k,k-1}$ (level 812) is shown as being somewhere between levels 813 and 811, but the particular value of level 812 needs to be determined.

2.2.1. Initial Value is $NSL_k$

Steps 610 to 614 of FIG. 6A can be used to determine an $NNL_{k,k-1}$ while steps 620 to 624 of FIG. 6B can determine an $NNL_{k,k+1}$.

Note that for a binary-encoded DDT, steps 610 to 614 can be used to determine $NNL_{1,0}$ while steps 620 to 624 can determine $NNL_{0,1}$.

For determination of $NNL_{k,k-1}$, the procedure begins with $NNL_{k,k-1}$ set to $NSL_k$ by setting the differential, between the DC offsets of a differential pair, to zero (step 610). The resulting SER ($SER_{mea}$) is measured (step 611). $SER_{mea}$ is compared to a $SER_{nn}$ (step 612). If $SER_{nn}$ has not been reached, the differential, between the DC offsets of the differential pair, is incrementally changed such that $NNL_{k,k-1}$ is incrementally reduced (step 613). Steps 611, 612 and 613 are repeated until $SER_{mea}$ is greater than $SER_{nn}$, at which point an $NNL_{k,k-1}$ has been determined for an $SER_{mea}$ that is as close as possible to $SER_{nn}$ for a given measurement apparatus. The value of $NNL_{k,k-1}$, corresponding to the best approximation to $SER_{nn}$, is the value for $NNL_{k,k-1}$ that had been used just prior to the last incremental reduction of $MSL_{k,k-1}$ (step 614).

A second incremental reduction of $NNL_{k,k-1}$, due to an application of step 613 of FIG. 6A, is represented in FIG. 8 by arrow 821.

Steps 620 to 624 operate in the same way, respectively, as steps 610 to 614, except for the following differences. Step 623 incrementally increases $NNL_{k,k+1}$ (also initially set to $NSL_k$), by changing the differential between the differential pair's DC offsets. Step 624 records, as the best value for $NNL_{k,k+1}$ to be used, the value to which $NNL_{k,k+1}$ had been set just prior to the last incremental increase of $NNL_{k,k+1}$.

A second incremental increase of the value for $NNL_{k,k+1}$, due to an application of step 623 of FIG. 6B, is represented in FIG. 8 by arrow 822.

With $NNL_{k,k-1}$ and $NNL_{k,k+1}$ initially set to $NSL_k$, the procedures of FIGS. 6A and 6B can begin with the DTS having an $SER_{mea}$ level that is too low to be measured within a practical time period. However, steps 611 and 621 need only determine whether $SER_{mea}$ is less than $SER_{nn}$. This can be accomplished, for example, by measuring for errors over a time period during which, if $SER_{mea}$ at least as large as $SER_{nn}$, a lower bound number of errors occurs. If the number of errors measured is, for example, zero, while the actual value of $SER_{mea}$ is not known, it is still known that $SER_{mea}$ is less than $SER_{nn}$.

2.2.2. Initial Value Is $TSL_{k,k-1}$ Or $TSL_{k,k+1}$

Steps 710 to 714 of FIG. 7A can be used to determine a value for $NNL_{k,k-1}$ while steps 720 to 724 of FIG. 7B can determine $NNL_{k,k+1}$.

Note that for a binary-encoded DDT, steps 710 to 714 can be used to determine $NNL_{1,0}$ while steps 720 to 724 can determine $NNL_{0,1}$.

For determination of $NNL_{k,k-1}$, the procedure begins with $NNL_{k,k-1}$ set to $TSL_{k,k-1}$ by setting the differential, between the DC offsets of a differential pair, to an appropriate value (step 710). The current SER ($SER_{mea}$) is measured (step 711). $SER_{mea}$ is compared to a $SER_{nn}$ (step 712). If $SER_{mea}$ is not less than or equal to $SER_{nn}$, the differential, between the DC offsets of the differential pair, is incrementally changed such that $NNL_{k,k-1}$ is incrementally increased (step 713). Steps 711, 712 and 713 are repeated until $SER_{mea}$ is less than $SER_{nn}$, at which point an $NNL_{k,k-1}$ has been determined for an $SER_{mea}$ that is as close as possible to $SER_{nn}$ for a given measurement apparatus. The value of $NNL_{k,k-1}$ corresponding to the best approximation of $SER_{nn}$ is the last incremental increase of $NNL_{k,k-1}$ (step 714).

A second incremental increase of $NNL_{k,k-1}$, due to an application of step 713 of FIG. 7A, is represented in FIG. 8 by arrow 820.

Steps 720 to 724 operate in the same way, respectively, as steps 710 to 714, except for the following differences. Step 723 incrementally decreases $NNL_{k,k+1}$ (initially set to $TSL_{k,k+1}$), by changing the differential between the differential pair's DC offsets. Step 724 records, as the best value for $NNL_{k,k+1}$ to be used, the value to which $NNL_{k,k+1}$ had been set as of the last incremental decrease of $NNL_{k,k+1}$.

A second incremental reduction of the $NNL_{k,k+1}$, due to an application of step 723 of FIG. 7B, is represented in FIG. 8 by arrow 823.

2.3 Exemplary Embodiments

Figure 9:
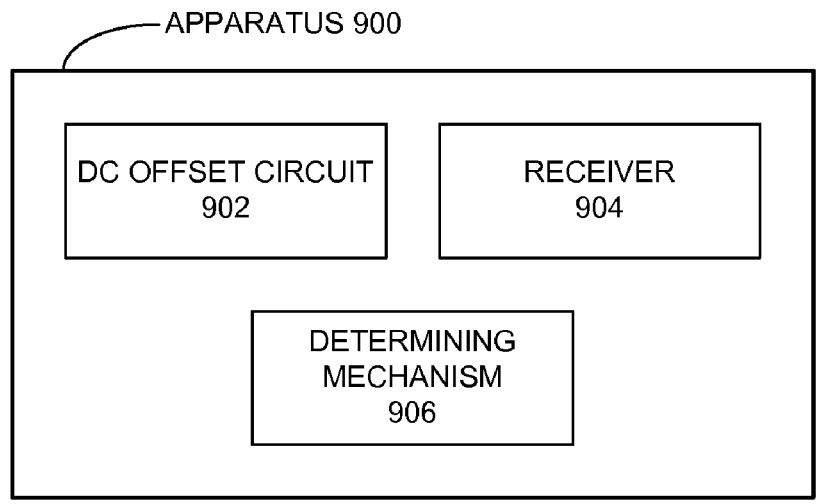

FIG. 9 illustrates an apparatus in accordance with an embodiment of the present invention. Apparatus 900 can determine a non-normal signal level for a symbol which produces a non-normal symbol-error-rate in a data transmission system. Apparatus 900 can include DC offset circuit 902, receiver 904, and determining mechanism 906.

DC offset circuit 902 can receive a differential input signal which encodes the symbol. A differential output signal of DC offset circuit 902 can be supplied to receiver 904. Determining mechanism 906 can be configured to determine the non-normal signal for the symbol by using the DC offset circuit to change a DC offset of each signal in the differential input signal by a different amount so that a symbol-error-rate measured by the receiver is substantially equal to the non-normal symbol-error-rate.

Figure 10:
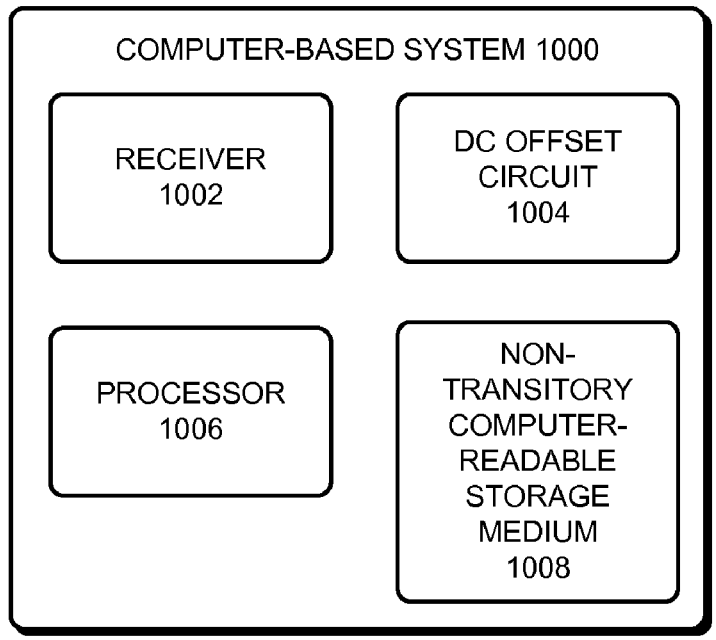

FIG. 10 illustrates a computer-based system in accordance with an embodiment of the present invention. Computer-based system 1000 can determine a non-normal signal level for a symbol which produces a non-normal symbol-error-rate in a data transmission system. Computer-based system 1000 can include receiver 1002, DC offset circuit 1004, processor 1006, and non-transitory computer-readable storage medium 1008.

A differential output signal of DC offset circuit 1004 can be supplied to receiver 1002. Non-transitory computer-readable storage medium 1008 can store instructions that when executed by processor 1006 cause computer-based system 1000 to determine the non-normal signal level for the symbol by using DC offset circuit 1004 to change a DC offset of each signal in the differential input signal by a different amount so that a symbol-error-rate measured by receiver 1002 is substantially equal to the non-normal symbol-error-rate.

3. Glossary of Selected Terms

BER: Bit Error Rate.
DDT: Differential Data Transmission.
DTS: Data Transmission System.
MOhm: mega-Ohm.
PAM4: Pulse Amplitude Modulation, with 4 amplitude levels, for encoding symbols.
SER: Symbol Error Rate.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method for determining a non-normal signal level for a symbol which produces a non-normal symbol-error-rate in a data transmission system, the method comprising:
    receiving a differential input signal at a DC offset circuit, wherein the differential input signal encodes the symbol, and wherein a differential output signal of the DC offset circuit is provided as input to a receiver; and
    determining the non-normal signal level for the symbol by using the DC offset circuit to change a DC offset of each signal in the differential input signal by a different amount so that a symbol-error-rate measured by the receiver is substantially equal to the non-normal symbol-error-rate.

2. The method of claim 1, wherein the DC offset circuit uses a digitally controllable voltage source.

3. The method of claim 1, wherein the DC offset circuit uses a digitally controllable current source.

4. The method of claim 1, wherein the non-normal signal level is used to estimate the data transmission system's symbol-error-rate under normal operating conditions.

5. The method of claim 1, wherein the differential input signal is received through coupling capacitors which are coupled with a transmitter.

6. A hardware apparatus for determining a non-normal signal level for a symbol which produces a non-normal symbol-error-rate in a data transmission system, the apparatus comprising:
    a receiver;
    a DC offset circuit which receives a differential input signal, wherein the differential input signal encodes the symbol, and wherein a differential output signal of the DC offset circuit is provided as input to the receiver; and
    circuitry to determine the non-normal signal level for the symbol by using the DC offset circuit to change a DC offset of each signal in the differential input signal by a different amount so that a symbol-error-rate measured by the receiver is substantially equal to the non-normal symbol-error-rate.

7. The hardware apparatus of claim 6, wherein the DC offset circuit includes a digitally controllable voltage source.

8. The hardware apparatus of claim 6, wherein the DC offset circuit includes a digitally controllable current source.

9. The hardware apparatus of claim 6, wherein the non-normal signal level is used to estimate the data transmission system's symbol-error-rate under normal operating conditions.

10. The hardware apparatus of claim 6, wherein the differential input signal is received through coupling capacitors which are coupled with a transmitter.

11. A computer-based system for determining a non-normal signal level for a symbol which produces a non-normal symbol-error-rate in a data transmission system, the computer-based system comprising:
    a receiver;
    a DC offset circuit which receives a differential input signal, wherein the differential input signal encodes the symbol, and wherein a differential output signal of the DC offset circuit is provided as input to the receiver;
    a processor; and
    a non-transitory computer-readable storage medium storing instructions that when executed by the processor cause the computer-based system to determine the non-normal signal level for the symbol by using the DC offset circuit to change a DC offset of each signal in the differential input signal by a different amount so that a symbol-error-rate measured by the receiver is substantially equal to the non-normal symbol-error-rate.

12. The computer-based system of claim 11, wherein the DC offset circuit uses a digitally controllable voltage source.

13. The computer-based system of claim 11, wherein the DC offset circuit uses a digitally controllable current source.

14. The computer-based system of claim 11, wherein the non-normal signal level is used to estimate the data transmission system's symbol-error-rate under normal operating conditions.

15. The computer-based system of claim 11, wherein the differential input signal is received through coupling capacitors which are coupled with a transmitter.

\* \* \* \* \*